Patented Sept. 9, 1952

2,610,132

UNITED STATES PATENT OFFICE 2,610,132

STARCH CONVERSION PROCESS

William B. Newkirk, La Grange, and John E. Dlouhy, Forest Park, Ill., assignors to Corn Products Refining Company, New York, N. Y., a corporation of New Jersey No Drawing. Application November 15, 1949, Serial No. 127,522

8 Claims. (Cl. 127—40)

This invention relates to the hydrolysis of starch to produce dextrose containing products. More particularly it relates to the acid hydrolysis of starch to form starch hydrolysates which are free from fat and starch or starch-like products. The invention is particularly applicable to the preparation of starch hydrolysates having low dextrose equivalent (D. E.) values, i. e. below 32. The term D. E., as used herein, refers to reducing sugar, calculated as dextrose, on dry basis.

It has been known for a number of years to prepare sirups, e. g. corn sirups, from starches. These sirups are usually prepared by hydrolyzing starch with acid or enzyme to the desired dextrose equivalent value, neutralizing the hydrolyzing acid or inactivating the enzyme, decolorizing with carbon and evaporating to the desired density. Sirups having various D. E. values have been prepared, i. e. ranging from 23 to 65. Recently, such sirups prepared from corn (maize) starch have been subjected to a drying treatment, e. g. spray drying, to form corn sirup solids.

For some application of corn sirup solids, it is desirable that such solids have a low D. E. value. This is particularly true where sweetness is not the main requirement and where high molecular weight bodies such as dextrins are required. However, such low D. E. products, i. e. having a D. E. value below about 32, usually always contain some unconverted starch or starch-like bodies which react positively to the usual methods of testing for the presence of starch. The presence of starch or starch-like bodies is objectionable in certain applications of starch hydrolysates. For example, these bodies have a tendency to cloud the sirup made therefrom. Low D. E. products, particularly when prepared from corn starch, also contain fat which is not removed by the usual refining methods. The presence of fat is objectionable because it develops "off" odors and flavors in the product.

An object of the present invention is to produce a starch hydrolysate which may have a low D. E. value and yet be free of starch and starch-like bodies and also fat. A further object is the preparation of a sirup from starch which sirup has the aforesaid properties. Still another object is the preparation of a corn sirup solids product having such properties. A further object is the provision of methods whereby the aforementioned products may be prepared. Further objects will appear more fully hereinafter.

We have now found that we can produce a starch hydrolysate having a low D. E. value and which is free of starch or starch-like bodies, and also fat, and which is readily adapted to concentration to a sirup or dried to a solid product in amorphous form. In general, our invention embraces cooling the acid starch hydrolysate liquor before or after neutralization to a temperature within the range of about 60° F. to about 140° F. and maintaining the temperature of the hydrolysate at this range for a period of time of at least one hour. As an optional step, particularly when the starting material is a root or tuber starch there may be added to the hydrolysate before or after the neutralization and cooling but prior to the holding steps certain adjuncts. The invention also contemplates the application of the cooling and holding treatment as aforementioned to acid starch hydrolysate liquor which has been prepared by hydrolysis involving a long holding time in the converter, e. g. up to 2 hours or more, as well as to acid starch hydrolysate liquor prepared in conventional manner wherein the time for the conversion is generally not more than 45 minutes, 15 to 30 minutes being the average time. A continuous converter of the type which will be described hereinafter lends itself to a long holding time for the conversion. The purpose of the cooling and holding steps is to allow any starch or starch-like bodies to react with the fats present in the hydrolysate to form an insoluble starch-fat complex, which can then be removed as by filtration. The term "fat-starch complex" includes starch-like bodies which form complexes with fatty materials. In usual commercial practice in preparing sirups, the hydrolysate is filtered immediately after neutralization to remove the fatty material. However, it has been found that in hydrolysates having low D. E. values, the fatty material is not as easily removed as in the case of hydrolysates having high D. E. values. Therefore, corn sirup solids having low D. E. values heretofore known have not been free of fats.

The present invention contemplates removing starch and starch-like products and fats from starch hydrolysates by effecting reaction between such starch and fatty materials. The fatty material may be that present in the hydrolysate or if such material is not present in sufficient quantity, as is likely to be the case when root or tuber starches are used as starting materials, additional amounts thereof may be added to the hydrolysate or the fatty material may be added in the form of an adjunct.

In carrying out the present invention, a starch slurry, e. g. corn starch, having a density of 18 to 24° Baumé is acidified to 0.010 to 0.020 normality with hydrochloric acid or other suitable acid such as sulfuric acid. The slurry is then hydrolyzed in the usual commercial batch converter or in a continuous type of converter until the desired D. E. level is attained. The pH of such hydrolysate is then adjusted to about 5.0 or below with sodium carbonate or other suitable alkaline material. The hydrolysate is then cooled to a temperature within the range of about 60° F. to about 140° F. and such temperature is maintained for a period of at least one hour or sufficiently long to permit the formation of the fat starch complex. As an optional step, a small amount of an adjunct, e. g. a soap such as sodium stearate, may be added before or after the pH adjustment, if the amount of fat present in the hydrolysate is below that required to form the starch-fat complex. Thereafter, the hydrolysate is subjected to filtration or other suitable operation to remove the fat-starch complex. The liquor is then treated in the customary manner with decolorizing and refining carbon and concentrated to the desired density or dried, as by spray drying.

In carrying out the process of the present invention, using corn starch or sorghum grain starch, it has been found that ordinarily there is sufficient fatty material present in the hydrolysate to react with all of the unconverted starch or starch-like bodies. However, if such is not the case, additional fatty material obtained from starch hydrolysates may be added. Or the fatty material may be added in the form of a fatty acid or a soap. Among the adjuncts which may be used for purposes of the present invention are soluble soaps such as household soaps; sodium stearate; palmitic acid, stearic acid, oleic acid, linoleic acid, linolenic acid, arachidic acid, lignoceric acid, myristic acid, lauric acid, capric acid and soluble soaps derived from such acids and mixtures of such soaps and acids.

The amount of the adjunct added may vary according to the amount of fatty material present in the hydrolysate. An excess of the adjunct is not detrimental as far as the formation of the complex is concerned but is not necessary to its formation, the theoretical amount being sufficient. Amounts in excess of about 1.75 percent, based on dry substance, are ineffective for formation of the complex. However, it is to be borne in mind that if excess adjunct is added, since it is soluble in water it will not be removed during processing and will appear in the final product. If an adjunct is to be added to the hydrolysate for purposes of the present invention, it is preferable to add it to the hydrolysate before neutralization, although this is not essential. Starch hydrolysates which are to be used in the production of sirups are ordinarily neutralized to a pH of about 5. At this pH the fatty and colloidal materials present in the hydrolysate coagulate more readily, and, hence, are more easily removed by filtration. Further, it is known that sirups having a pH above about 5 or 5.5 have a tendency to darken in color. Therefore, if the adjunct added has an effect on the pH value, it is preferable to add it to the hydrolysate before neutralization to a pH of about 5. However, the holding step may be effected at a pH between about 2.0 and about 9.0.

The temperature of the hydrolysate during the holding period should be within the range of about 60° F. to about 140° F. The preferred temperature is about 100° F.

The extent of the holding period should be sufficient to allow the formation of the fat-starch complex. Ordinarily, at least one hour is required but usually a longer period of time, e. g. two hours, is preferred. A holding period of more than two hours is not detrimental but does not increase the formation of the fat-starch complex.

The fat-starch complex may be removed by any suitable method such as by filtering or centrifuging.

The principles of the present invention are applicable to acid starch hydrolysate liquors having D. E. values ranging from about 10 to 32. Acid starch hydrolysate liquors having D. E. values above 32 do not ordinarily contain any unconverted starch or starch-like bodies. While the invention is generally applicable to acid starch hydrolysate liquors having D. E. values anywhere below 32, it is not practical to apply it to liquors having D. E. values below about 10.

The continuous converter generally consists of an entry chamber where acidified starch suspension is mixed with steam through an instantaneous type heater; an hydrolysis coil constructed of straight lengths of pipe connected by 180° return bends, arranged in horizontal or vertical banks, where the major part of the hydrolysis takes place; and a flash chamber to receive the hydrolyzed product. The continuous converter is equipped with suitable valves and level controls to maintain a continuous flow through the system at the desired flow rate.

The following examples which are intended as informative and typical only and not in a limiting sense will further illustrate the invention.

Example I

A corn starch slurry having a density of 18 Bé. was converted in a continuous converter with 0.016 N sulfuric acid to a D. E. value of about 16. The hydrolysate was then treated with bentonite to remove fatty and colloidal materials, then filtered, the filtrate neutralized to a pH of 4.8, treated with carbon to decolorize and finally spray dried. Such spray dried material gave a positive reaction when tested by the A. O. A. C. method of testing for the presence of starch but contained substantially no fat.

A sample of such spray dried material was dissolved in water to form a solution having a density of 15.0 Bé. at 60° F. To the solution was added 35 ml. of 0.1 N sodium stearate per liter of solution to assure the presence of sufficient fatty material for formation of the starch-fat complex. The pH of the resulting solution was then adjusted to 3.5. The temperature of such solution was adjusted to 100° F. and such temperature was maintained for a period of two hours, thereafter the solution was filtered. It was found such solution now contained substantially no starch or starch-like bodies when tested by the standard iodine method for the presence of starch.

Example II

To 12 liters of water was added 4173 g. of corn starch, resulting in a slurry density of 15 Bé. at 60° F. After adding 20 ml. of concentrated hydrochloric acid as catalyst, the mixture was converted in an autoclave with a steam pressure of 11 p. s. i. for a period of one hour. The hydrolysate which had a D. E. value of 15.1 was neutralized with sodium hydroxide to a pH of 4.5 and separated into two parts. Part "A" was filtered and treated with carbon immediately whereas Part "B" was cooled to 100° F. and maintained at this temperature for two hours after which it was filtered and treated with carbon. Finished samples of liquors "A" and "B" were then tested qualitatively by the starch iodine test for the presence of starch. The amount of material which precipitated as a complex with iodine was also measured to determine how much starch was present. The results are summarized in the table which follows Example III.

*Example III*

An acidified starch slurry identical to that used in Example II was prepared and converted at 17 p. s. i. steam pressure for 20 minutes. The hydrolysate had a D. E. value of 13.8 and was treated as in Example II. The results are shown in the table.

The above results show that the "B" liquors of Examples II and III processed by the method of this invention, unlike the "A" liquors which were processed by the conventional methods, showed negative qualitative results for starch by the standard iodine test and also contained no or barely detectable amounts of material which precipitated as a complex with iodine.

The "B" liquors after the cooling and holding treatment were also substantially free of fat.

*Table*

| Example | Degree of Conversion (D. E.) | Color Developed with Iodine | Iodine Complex p. p. t. after Filtration (ml.) |
|---|---|---|---|
| 1a | 15.1 | Violet | 0.6 |
| 1b | 15.1 | Tan | 0.0 |
| 2a | 13.8 | Purple | 2.9 |
| 2b | 13.8 | Brown | trace |

We claim:
1. In the process of preparing sirups from acid starch hydrolysate liquors having a D. E. value within the range of about 10 to about 32 by hydrolyzing starch with acid to a predetermined D. E. value followed by neutralization of the acid in the liquor to a pH of about 5 and refining and evaporating the liquor, the improvement which comprises adding to the liquor prior to neutralization a sufficient amount of material from the group consisting of fatty acids derived from the hydrolysis of corn starch; fatty acids derived from the hydrolysis of sorghum grain starch; household soaps; sodium stearate; palmitic acid, stearic acid, oleic acid, linoleic acid, linolenic acid, arachidic acid, lignoceric acid, myristic acid, lauric acid, capric acid; soluble soaps derived from such acids, and mixtures of any of such soaps and acids, to react with the starch and/or starch-like bodies present to form a complex with the starch, cooling the liquor to a temperature within the range of about 60° F. to about 140° F. and maintaining the temperature of the cooled liquor within such range for at least one hour, and thereafter removing the fat-starch complex from the liquor.

2. The process of preparing a sirup which may be dried to solid amorphous form which comprises converting starch with acid to produce a starch hydrolysate liquor with a D. E. value of about 10 to about 32, adding to the liquor an adjunct from the group consisting of fatty acids, derived from the hydrolysis of corn starch; fatty acids derived from the hydrolysis of sorghum grain starch; household soaps; sodium stearate; palmitic acid, stearic acid, oleic acid, linoleic acid, linolenic acid, arachidic acid, lignoceric acid, myristic acid, lauric acid, capric acid, soaps derived from such acids, and mixtures of any of such soaps and acids, to react with the starch and/or starch-like bodies present, cooling the liquor to about 60° F. to about 140° F., adjusting the pH to about 2 to 9, maintaining the temperature of the liquor within the range of 60° F. to 140° F. for at least one hour to allow the formation of fat-starch complex, removing the fat-starch complex, and thereafter decolorizing and concentrating the liquor.

3. The process of preparing a sirup which may be dried to solid amorphous form which comprises converting starch with acid to produce a starch hydrolysate liquor with a D. E. value of about 10 to about 32, adding to the liquor fatty acids derived from the hydrolysis of starch with acid, to react with the starch and/or starch-like bodies present, cooling the liquor to about 60° F. to about 140° F., adjusting the pH to about 2 to 9, maintaining the temperature of the liquor within the range of 60° F. to 140° F. for at least one hour to allow the formation of fat-starch complex, removing the fat-starch complex, and thereafter decolorizing and concentrating the liquor.

4. The process according to claim 3 wherein the added material is sodium stearate.

5. The process according to claim 3 wherein the added material is the fatty material obtained by the hydrolysis of corn starch.

6. The process according to claim 1 wherein the added material is household soaps.

7. The process according to claim 1 wherein the added material is the fatty material obtained by the hydrolysis of corn starch.

8. The process according to claim 3 wherein the added material is the fatty material obtained by the hydrolysis of sorghum grain starch.

WILLIAM B. NEWKIRK.
JOHN E. DLOUHY.

REFERENCES CITED

The following references are of record in the file of this patent:

UNITED STATES PATENTS

| Number | Name | Date |
|---|---|---|
| 270,042 | Fell | Jan. 2, 1883 |